(12) United States Patent
Krajnc et al.

(10) Patent No.: US 11,950,341 B2
(45) Date of Patent: Apr. 2, 2024

(54) PROXIMITY-DETECTING DEVICE

(71) Applicant: SIGNIFY HOLDING B.V., Eindhoven (NL)

(72) Inventors: Hugo Jose Krajnc, Eindhoven (NL); Dzmitry Aliakseyeu, Veldhoven (NL); Berent Willem Meerbeek, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 227 days.

(21) Appl. No.: 17/635,032

(22) PCT Filed: Aug. 4, 2020

(86) PCT No.: PCT/EP2020/071907
§ 371 (c)(1),
(2) Date: Feb. 14, 2022

(87) PCT Pub. No.: WO2021/032468
PCT Pub. Date: Feb. 25, 2021

(65) Prior Publication Data
US 2022/0295622 A1 Sep. 15, 2022

(30) Foreign Application Priority Data

Aug. 16, 2019 (EP) ..................... 19192088

(51) Int. Cl.
*H05B 47/115* (2020.01)
*H04B 17/318* (2015.01)
(Continued)

(52) U.S. Cl.
CPC ......... *H05B 47/115* (2020.01); *H04B 17/318* (2015.01); *H04W 4/80* (2018.02); *H05B 47/19* (2020.01); *Y02B 20/40* (2013.01)

(58) Field of Classification Search
CPC .... H05B 47/115; H05B 47/19; H04B 17/318; H04W 4/80; H04W 4/023; Y02B 20/40; G01V 8/10
See application file for complete search history.

(56) References Cited

U.S. PATENT DOCUMENTS

| 2014/0015415 A1* | 1/2014 | Lim | ..................... H05B 47/17 315/131 |
| 2014/0285113 A1* | 9/2014 | Huang | ..................... H05B 47/19 315/297 |

(Continued)

FOREIGN PATENT DOCUMENTS

| EP | 2803248 A1 | 11/2014 |
| EP | 3092858 B1 | 12/2018 |

(Continued)

*Primary Examiner* — An T Nguyen (57) ABSTRACT

The invention is directed to a proximity-detecting device configured to determine a signal-strength value (S) indicative of a received signal power amount of an identification signal of an originating lighting node that comprises lighting-node identification information and that is received via a signal input unit (102). It also comprises a proximity-detection unit (106) configured, upon determining that the received signal-strength value exceeds a predetermined proximity threshold value ($S_{th}$), to generate and provide a proximity-information signal (P) indicative of the proximity-detecting device being within a proximity area. It also comprises a threshold-determination unit (108) configured, upon determining fulfilment of a pre-stored threshold-updating criterion (C) comprising one or more updating-conditions associated with the lighting-node identification information, to update the proximity threshold value for the given originating lighting node, for redefining the adaptation.

13 Claims, 5 Drawing Sheets

(51) Int. Cl.
*H04W 4/80* (2018.01)
*H05B 47/19* (2020.01)

(56) References Cited

U.S. PATENT DOCUMENTS

| | | | |
|---|---|---|---|
| 2015/0137699 A1* | 5/2015 | Killo | H05B 47/19 |
| | | | 340/12.5 |
| 2016/0286624 A1* | 9/2016 | Patel | H05B 47/175 |
| 2016/0323982 A1* | 11/2016 | Ku | H05B 47/19 |
| 2018/0255626 A1* | 9/2018 | Deixler | H05B 45/14 |
| 2018/0263096 A1* | 9/2018 | Deixler | H05B 47/19 |
| 2019/0036722 A1 | 1/2019 | Singamsetty et al. | |
| 2019/0132055 A1* | 5/2019 | Deixler | H04B 10/116 |
| 2020/0021454 A1* | 1/2020 | Pandharipande | H05B 47/175 |
| 2020/0084863 A1* | 3/2020 | Taylor | H04L 67/04 |
| 2020/0288558 A1* | 9/2020 | Anderson | H05B 45/14 |
| 2022/0295622 A1* | 9/2022 | Krajnc | H04W 4/023 |

FOREIGN PATENT DOCUMENTS

| | | | |
|---|---|---|---|
| WO | 2008078245 | A2 | 7/2008 |
| WO | 2016010714 | A1 | 1/2016 |

* cited by examiner

PROXIMITY-DETECTING DEVICE

CROSS-REFERENCE TO PRIOR APPLICATIONS

This application is the U.S. National Phase application under 35 U.S.C. § 371 of International Application No. PCT/EP2020/071907, filed on Aug. 4, 2020, which claims the benefit of European Patent Application No. 19192088.3, filed on Aug. 16, 2019. These applications are hereby incorporated by reference herein.

FIELD OF THE INVENTION

The present invention is directed to a proximity-detecting device, to a lighting arrangement, to a method for operating a proximity-detecting device, to a method for controlling operation of a lighting arrangement and to a computer program.

BACKGROUND OF THE INVENTION

WO 2016/010714 describes a Bluetooth zone control system that comprises a machine having a first Bluetooth device which is configured to provide a first Bluetooth signal and a control unit having a second Bluetooth device configured to detect the first Bluetooth signal. The control unit is configured to control the machine based on first authorization rights when the second Bluetooth device detects the first Bluetooth signal at or above a proximity signal threshold.

SUMMARY OF THE INVENTION

The inventors have realized that manually adjusting the proximity signal thresholds of different devices is particularly complex and time consuming. It would be beneficial to enable a dynamic adjustment of the proximity signal threshold without explicit user interaction.

According to a first aspect of the present invention, a proximity-detecting device is described. The proximity-detecting device comprises a signal input unit for receiving, from external originating lighting nodes, wireless identification signals comprising respective lighting-node identification information. It also comprises a signal-strength determination unit connected to the signal input unit and configured to determine a signal-strength value indicative of a received signal power amount of the identification signal of the respective originating lighting node. The proximity-detecting device further includes a proximity-detection unit connected to the signal-strength determination unit and configured, upon determining that the received-signal-strength value exceeds a predetermined proximity threshold value associated with the originating lighting node, to generate and provide a proximity-information signal indicative of the proximity-detecting device being located within a predetermined proximity area of the originating lighting node and a threshold-determination unit connected to the signal input unit, to the signal-strength determination unit and to the proximity-detection unit and configured, upon determining fulfilment of a pre-stored threshold-updating criterion, for updating a given proximity threshold value for a given originating lighting node, wherein the threshold-updating criterion comprises one or more updating-conditions associated with the node identification information of the received identification signals, to update the proximity threshold value for the given originating lighting node, for redefining the proximity area associated with the given originating lighting node.

The external originating lighting nodes are configured to provide the wireless identification signals comprising respective lighting-node identification information. A proximity-detecting device located within a maximal signal range of a given originating lighting node is capable of receiving, via the signal input unit, the corresponding identification signal. The signal-strength determination unit is then configured to determine the signal-strength value indicative of the power amount of the identification signal as received, which is less than the power amount of the identification signal as emitted by the lighting node. The power amount of the received identification signal thus depends, among other parameters, on a distance between the originating lighting node and the proximity-detecting device. Once the signal-strength value is determined, the proximity-detection unit compares this value with a predetermined proximity threshold value. If the proximity threshold value is exceeded, i.e. if the received signal strength value is higher than the threshold, a proximity-information signal is generated and provided. The proximity-information signal is thus indicative of the proximity-detecting device being within a proximity area of the originating lighting node. The proximity area is defined as that volume in space in which the received signal strength value is higher than the predetermined proximity threshold value. A change of the proximity threshold value directly redefines the proximity area associated to the lighting node. An increase of the proximity threshold value results in a smaller proximity area and vice versa.

The proximity-detecting device of the first aspect is advantageously configured to enable a dynamic adaptation of the proximity threshold values associated to a respective lighting node using pre-stored threshold-updating criteria. A given threshold-updating criterion comprises one or more updating conditions that must be fulfilled in order to adapt the proximity threshold value. The updating conditions are associated to the lighting-node identification information of the respective lighting node.

The threshold-determination unit thus determines whether a given threshold-updating criterion is fulfilled and, as a result of the fulfilment, updates the proximity threshold node by a predetermined amount, depending on the threshold-updating criterion fulfilled.

In the following, embodiments of the first aspect of the invention will be described.

In a particular embodiment, the identification signal is a beacon signal.

In a particular embodiment, the proximity-information signal is provided to an external device that is configured to receive the proximity-information signal and to provide, to the originating lighting node, operation-data indicative of a predetermined operation-instruction, such as, but not limited to, an instruction intended to initiate light emission by the lighting node.

Alternatively, in another embodiment, the proximity-detecting device further comprises a node-control unit that is configured to receive the proximity-information signal from the proximity-detection unit, to generate operation-data indicative of a predetermined operation-instruction for controlling operation of the originating lighting node within the proximity area and to provide the operation-data to the originating lighting node within the proximity area. Thus, this embodiment can be advantageously used to control operation of the lighting nodes based on a presence or absence of the proximity-detecting device within a proximity area. For instance, it can be used to turn on a lighting function of the originating lighting node or to control lighting parameters of the emitted light, such as color temperature, color spectrum, beam angle, beam width, temporal behavior, or light intensity.

An embodiment of the proximity-detecting device is configured to set an initial proximity threshold value. Another embodiment is alternatively or additionally configured to update an already existing proximity threshold value.

The setting and/or updating of the proximity threshold value is performed based on the node-identification information. In an embodiment, the node-identification information is transmitted via the identification signal as status information of the respective originating lighting node. In another embodiment, the node identification information is additionally obtained from a stored list of identification-information associated to the respective originating lighting nodes. For instance, the identification signal includes data identifying the originating lighting node and the proximity-detecting device is configured to access an internal or an external database comprising node-identification information associated to the originating lighting node.

In an embodiment, the threshold-determination unit is configured to determine a number of proximity areas of originating lighting nodes within which the proximity-detecting device is simultaneously located. This is for instance obtained from the number of proximity-information signals provided within a predetermined time span. In this embodiment, the updating-conditions comprise a detection of an increase of said number. The threshold-determination unit is configured, upon fulfillment of the threshold-updating criterion, to increase the proximity threshold value of at least one of the originating lighting nodes that are within the respective proximity area by a predetermined amount, thereby reducing a size of an overlapping region of the proximity areas associated to the originating nodes.

In an embodiment, the proximity threshold values associated to the originating lighting nodes whose received signal strength value exceeds the corresponding threshold are changed by a same amount, absolute or relative. Alternatively, and depending on the threshold-updating criterion, the change of the proximity threshold values is different for each lighting node, or only one of the proximity threshold values is changed.

In another embodiment, the threshold-determination unit is additionally configured to ascertain, from the lighting-node identification information received, power-information indicative of a transmission-power amount of the respective identification signal, and, using the power-information, to determine which of the signal strength threshold values is to be changed.

For instance, according to a preferred threshold-updating criterion comprising an updating condition regarding the transmission power amount, the proximity threshold value of those lighting nodes which, according to the received lighting-node identification information, have lower transmission power, are increased by a given amount so that the proximity area is comparatively smaller than that of the lighting node with higher transmission power.

The power information is, in a particular example, indicative of a nominal transmission power. In another example, the power information is additionally indicative of a current transmission power. In an embodiment, the threshold-determination unit is configured to determine, based on the power information, whether or not the identification signal is being provided with a transmission power lower than the nominal transmission power. In this case, the signal-strength value of the received signal power amount of the identification signal will be lower. A predetermined pre-stored threshold-updating criterion includes an updating condition referring to the current transmission power and the nominal transmission power. This advantageously avoids assuming that the proximity device is not in the proximity area when it is, just because the external originating lighting node is for some reason providing the identification signal with a lower transmission power.

Alternatively, or additionally, in another embodiment the threshold-determination unit is further configured to ascertain, from the lighting-node identification information received, location-information indicative of an assigned installation location of the originating lighting node. In this particular embodiment, the updating-conditions comprise a detection of one of a set of predetermined installation locations. Further, the threshold-determination unit is configured to determine, using the ascertained installation location, which of the signal strength threshold values is to be changed.

Suitable exemplary assigned installation locations are, for instance, "door", "entrance", "corridor", "window", "porch", "façade" or any other terms related to a specific location at which a lighting node can be arranged. Further suitable terms are also terms associated to a group/room in which the lighting node is placed (e.g. toilet, living, hallway) or terms associated to the type or application of the lighting node (e.g. wall light, kitchen pendant, bathroom ceiling light). This installation location information can, for example, be provided by a user through configuration in a smartphone app or retrieved from a building information model (BIM). In this particular case, the threshold-determination unit is advantageously configured to determine, using the ascertained installation location, i.e. determining whether or not the node identification information includes a reference to one of a set of predetermined installation locations, which of the signal strength threshold values is to be changed. This is beneficial in cases where a specific location is more exposed to false positives than another one. For example, a lighting node arranged close to a door, and labeled as "door" or "entrance", will be prone to be triggered by a proximity-detecting device located at the other side of the door. In this particular case it would be beneficial to increase the proximity threshold value and thus to avoid undesired triggering of the lighting node.

In a preferred embodiment, the signal input unit is further configured to receive operation-data indicative of an operation-instruction directed to one or more of the lighting nodes for controlling operation of the lighting nodes. In this embodiment, the updating-conditions comprise a detection of one of a set of predetermined operation-instructions. The threshold-determination unit is further connected to the operation-data input and additionally configured to update the proximity threshold value further using the received operation-data.

This particular embodiment widens the possibilities for updating the proximity threshold values by enabling the use of updating-conditions associated to operation-instructions directed to the lighting nodes. The operation-instructions include, but are not limited to, instructions requiring the lighting node to initiate emission of light, to cease emission of light or to change one or more lighting parameters, such as light intensity, color spectrum, beam width, beam angle, temporal behavior, and color temperature.

For instance, a given threshold-updating criterion is based on the detection, within a predetermined time span of operation-instructions directed to the same lighting node in which proximity area the proximity-detecting device is located, and on the determination of whether or not the received operation-instruction overrides that operation-instruction generated in response to the reception of the proximity information signal. As a non-limiting example, if due to the existing distance between the proximity-detecting device and a given lighting node, a proximity information signal is generated which causes the provision of an operation-instruction to the lighting node for initiating emission of light, and within a predetermined time span of, for instance, 10 or 20 seconds, another operating instruction indicative of a desire to cease emission of light is wirelessly provided to the lighting node, and also received by the proximity-detecting device, the threshold-determination unit is advantageously configured to increase the proximity threshold value associated to that lighting node, since it can be inferred that the automatic, i.e. without explicit user interaction, triggering of the emission of light was not desired by the user.

In a particular embodiment the proximity-detecting device is comprised by a mobile phone having a suitable control application program installed. In another embodiment, the proximity-detecting device is integrated in a smart watch or in another wearable device. In another embodiment, the proximity-detecting device is integrated in a portable light control device (e.g. remote control/switch), or a portable light source.

According to a second aspect of the invention, a lighting arrangement is described. The lighting arrangement comprises a proximity-detecting device according to the first aspect of the invention and at least one lighting node. The lighting node includes a lighting unit configured to emit light, an identification-signal output unit for providing a wireless identification signal comprising lighting node identification information, an input unit for receiving operation-data comprising an operation-instruction and a lighting control unit configured to receive the operation-instruction and to control operation of the lighting unit using the operation-instruction. The lighting arrangement also comprises an arrangement control unit configured to receive, from the proximity-detecting device, the proximity-information signal and to generate and provide operation-data comprising a predetermined operation-instruction for controlling operation of the originating lighting node within the proximity area.

The lighting arrangement of the second aspect thus shares the advantages of the proximity-detecting device or of any of its embodiments.

In a particular embodiment of the lighting arrangement, the proximity-detecting device comprises the arrangement control unit, in particular as a node control unit as described above with reference to a particular embodiment of the first aspect.

In an embodiment of the lighting arrangement the provision of the wireless identification signals and of the operation-data is performed in accordance with a wireless communication protocol. Suitable wireless communication protocols include, but are not limited to, protocols in accordance with IEEE 802.11, such as WiFi, and IEEE 802.15, such as WPAN/Bluetooth, High-rate WPAN, Low-rate WPAN, Mesh Networking protocols, etc. In particular, in an embodiment, the wireless communication protocol is in accordance with the IEEE 802.15.4 standard, e.g. a ZigBee or Thread communication protocol.

According to a third aspect of the present invention, a method for operating a proximity-detecting device is described. The method comprises:
receiving, from originating lighting nodes, wireless identification signals comprising respective lighting-node identification information;
determining a signal-strength value indicative of a received signal power amount of the identification signal of the respective originating lighting node;
upon determining that the received-signal-strength value exceeds a predetermined proximity threshold value associated with the originating lighting node, generating and providing a proximity-information signal indicative of the originating lighting node being located within a predetermined proximity area of the proximity-detection device; and
upon determining fulfilment of a pre-stored threshold-updating criterion for updating a given proximity threshold value for a given originating lighting node, wherein the threshold-updating criterion comprises one or more updating-conditions associated with the node identification information of the received identification signals, updating the proximity threshold value for the given originating lighting node, for redefining the proximity area associated with the given originating lighting node.

The method of the third aspect thus shares the advantages of the proximity-detecting device of the first aspect or of any of its embodiments.

In particular, in an embodiment of the method of the third aspect, the method further comprises receiving the proximity-information signal, generating operation-data indicative of a predetermined operation-instruction for controlling operation of the originating lighting node within the proximity area and providing the operation-data to the originating lighting node within the proximity area.

According to a fourth aspect of the present invention, a method for controlling operation of a lighting arrangement is described. The method comprises providing wireless identification signals comprising lighting-node identification information and carrying out the method of the third aspect.

According to a fifth aspect of the invention, a computer program is described that comprises instructions which, when the program is executed by a computer, cause the computer to carry out the method of the third aspect.

It shall be understood that the proximity-detecting device of claim 1, the lighting arrangement of claim 7, the method for operating a proximity-detecting device of claim 10, the method for operating a lighting arrangement of claim 12 and the computer program of claim 13, have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
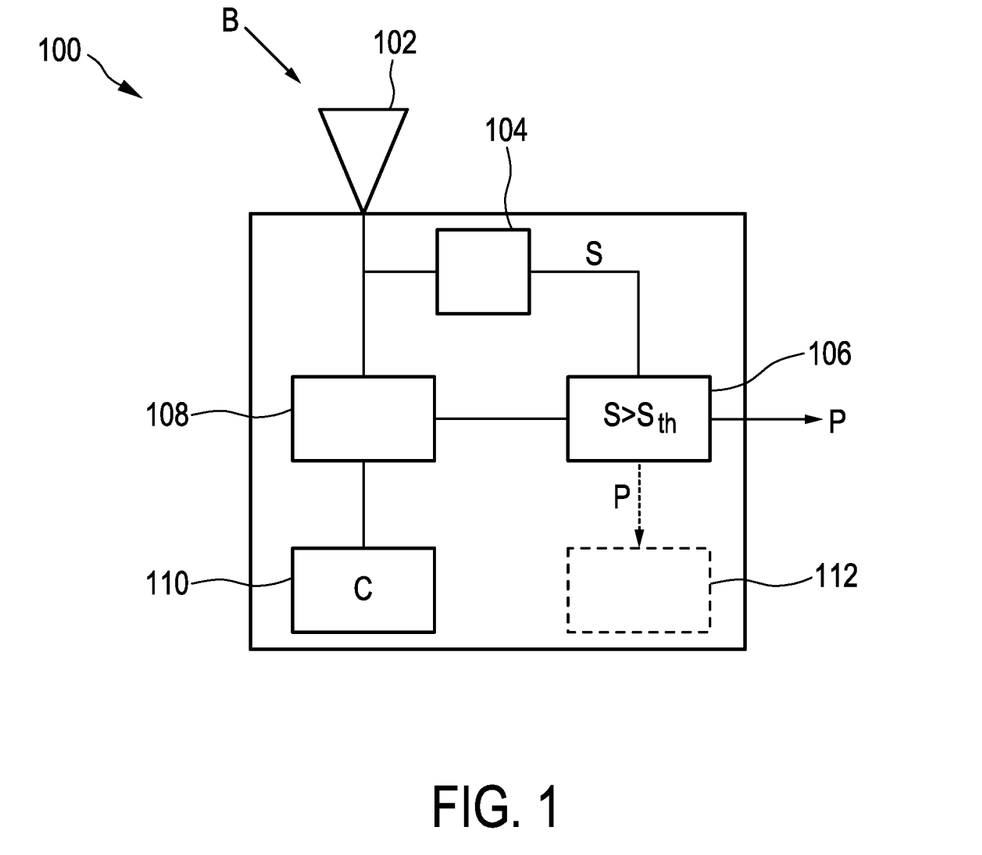
FIG. 1 shows a schematic block diagram of an embodiment of a proximity-detecting device.

FIG. 1 shows an exemplary proximity-detecting device 100. The proximity-detecting device 100 comprises a signal input unit 102 for receiving, from external originating lighting nodes (not shown), wireless identification signals B that comprise respective lighting-node identification information. The proximity-detecting device also comprises a signal-strength determination unit 104 that is connected to the signal input unit 102 and configured to determine a signal-strength value S indicative of a received signal power amount of the identification signal of the respective originating lighting node. The proximity-sensing device 100 further comprises a proximity-detection unit 106 that is connected to the signal-strength determination unit 104 and configured, upon determining that the received-signal-strength value exceeds a predetermined proximity threshold value $S_{th}$ associated with the originating lighting node, to generate and provide a proximity-information signal P indicative of the proximity-detection device being located within a predetermined proximity area of the originating lighting node.

In this particular example, the signal-strength determination unit is configured to determine a received signal-strength indicator value, referred to as RSSI value, although other exemplary proximity-detecting device use alternative known metrics for determining the signal-strength value S.

The lighting nodes are configured to periodically transmit the wireless identification signals for notifying their presence to devices configured to receive and interpret those identification signals, such as the proximity-detecting device 100. The identification signals comprise lighting-node identification information that allow the proximity-detection device 100 receiving the identification signals to determine which is the originating lighting node for a given identification signal. Further, the lighting node information may comprise information pertaining to a type of device, a nominal transmission power capacity, a location at which it is arranged. Alternatively, other devices, including the proximity-detecting device, may comprise a list associating each originating lighting node to a set of parameters such as the ones named above.

When the proximity-detecting device 100 receives the identification signal, it determines the signal-strength value thereof, which mainly depends on the transmission power with which the lighting node has provided the identification signal and on a distance between the lighting node and the proximity-detecting device. For a fixed transmission power amount, and neglecting the effects of the environment such as signal reflections, multipath transmission, etc., the signal-strength value increases as the distance between both devices decreases. If the determined value is above the respective proximity threshold value associated to the originating lighting node, the proximity-information signal P is provided.

Therefore, varying the proximity threshold value associated to a given originating lighting node alters the volume in which the proximity-information signal P can be generated and provided. This volume is referred to as proximity area. Decreasing the proximity threshold value increases the size of the proximity area and vice versa.

In order to enable a dynamic variation of the proximity threshold values, the proximity-detecting device also comprises a threshold-determination unit 108 that is connected to the signal input unit 102, to the signal-strength determination unit 104 and to the proximity-detection unit 106. The threshold determination unit is configured to determine a fulfilment of a pre-stored threshold-updating criterion C for updating a given proximity threshold value for a given originating lighting node. The threshold-updating criterion comprises one or more updating-conditions associated with the node identification information of the received identification signals. Upon determining the fulfillment, the threshold-determination unit is configured to update the proximity threshold value for the given originating lighting node and thus to redefine the proximity area associated with the given originating lighting node.

An alternative proximity-detecting device further comprises a node-control unit 112, as indicated with a dashed line in FIG. 1. The node-control unit is configured to receive the proximity-information signal P from the proximity-detection unit 106, to generate operation-data O indicative of a predetermined operation-instruction for controlling operation of the originating lighting node within the proximity area and to provide the operation-data O to the originating lighting node within the proximity area.

Alternatively, or additionally, the signal input unit can be further configured to receive operation-data indicative of an operation-instruction directed to one or more of the lighting nodes. The operation-data can be received directly from the lighting node, via a lighting arrangement control unit, such as, for instance, a bridge, via cloud, from a smart-home device, from a voice-assistance device, etc. The operation-instruction is suitable for controlling operation of the lighting node and are, for example, indicative of an instruction to enable emission of light, to disable emission of light or to change a given light parameter of the lighting node, such as, but not limited to, color spectrum, light intensity, beam angle, beam width, color temperature or any combination thereof. In this particular proximity-detecting device, the updating-conditions comprise a detection of one of a set of predetermined operation-instructions, e.g. "turn-on", "turn-off", "set lighting parameter X to value Y", etc. The threshold-determination unit is further connected to the operation-data input and additionally configured to update the proximity threshold value further using the received operation-data.

Figure 2:
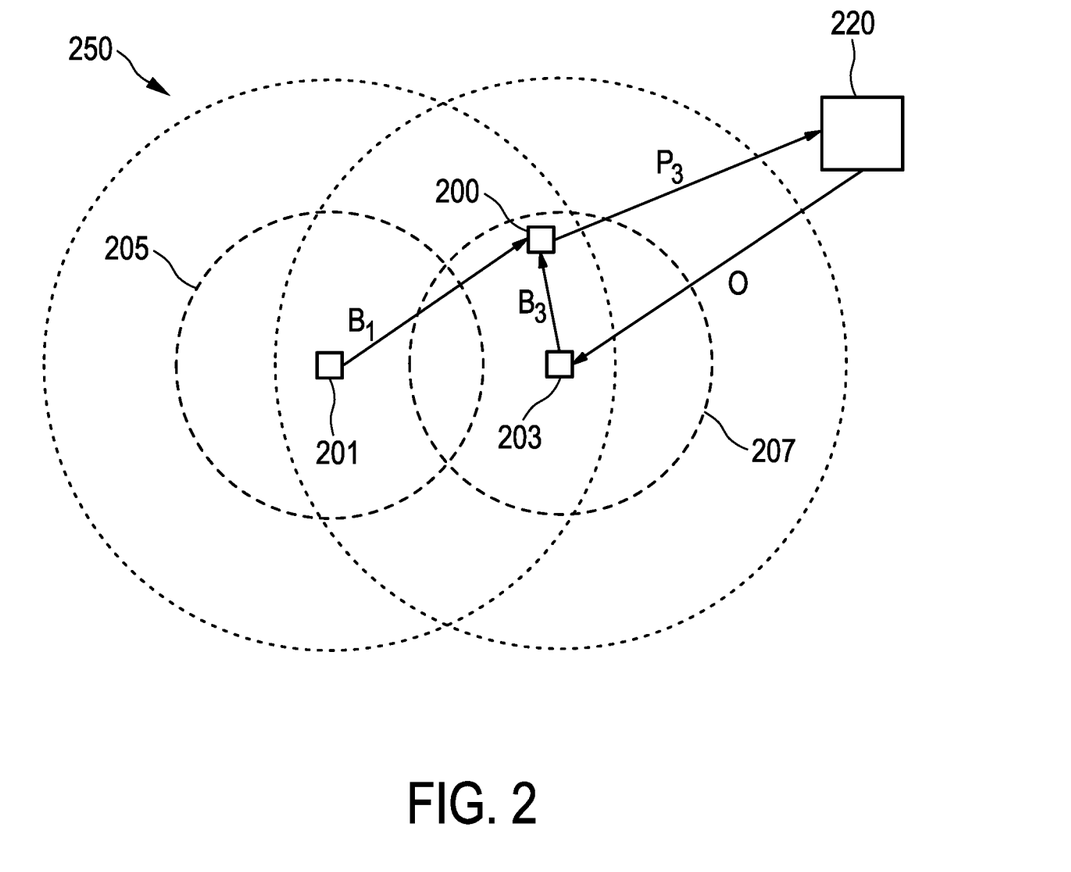
FIG. 2 shows a schematic diagram of an embodiment of a lighting arrangement comprising a proximity-detecting device, two lighting nodes and an arrangement control unit.

FIG. 2 shows a block diagram of an exemplary lighting arrangement 250. The lighting arrangement 250 comprises a proximity-detecting device 200 similar to the proximity-detecting device 100 of FIG. 1. The lighting arrangement comprises two lighting nodes 201, 203, which include a lighting unit configured to emit light (not shown), an identification-signal output unit for providing a wireless identification signal B comprising lighting node identification information, an input unit for receiving operation-data comprising an operation-instruction, and a lighting control unit configured to receive the operation-instruction and to control operation of the lighting unit using the operation-instruction.

The maximal signal range of the identification signals $B_1$ and $B_3$, originating respectively from lighting nodes 201 and 203, is shown as the outermost dotted line and depends on the transmission power with which the respective identification signal is provided. Merely using the reception of the identification signal for providing the proximity-information signal, however, can lead to confusing results in some situations, mainly as a function of the amount of lighting nodes that can be triggered based on their location with respect to the proximity-detecting device. Due to effects such as directionality, multipath trajectories, absorption and reflection in objects, etc., it is not always possible to specify a field of view or detection area for the lighting nodes. Therefore, the extent of the signal ranges depends on multiple parameters, which, from a user's perspective, can mean that it is not predictable when the resulting action will take place. In order to overcome this problem, the proximity-detecting device generates and provides the proximity information signal only when the determined signal strength value exceeds the corresponding proximity threshold.

Each lighting node has a proximity area, 205 and 207 respectively, which depends on the proximity threshold value assigned to each lighting node. In the example shown in FIG. 2 the maximal signal range and the proximity areas are represented as circles for the sake of clarity.

The lighting arrangement 250 further comprises an arrangement control unit 220 that is configured to receive, from the proximity-detecting device 200, the proximity-information signal P, and to generate and provide operation-data O comprising a predetermined operation-instruction for controlling operation of the originating lighting node within the proximity area. Alternatively, the lighting arrangement can also include a proximity-detecting device comprising a node-control unit.

The arrangement is thus advantageously configured to control operation of the lighting nodes based on a distance between the proximity-detecting device and a respective lighting node. In the exemplary arrangement 250, the lighting unit of a given lighting node is turned on upon determining that the proximity-detecting device is within the proximity area associated to said lighting node. For instance, the proximity-detecting device can be carried by a user as part of a mobile phone, a portable lighting control device such as a remote controller or a switch), a smart-watch or other alternative wearable devices and can be used to turn on lights as soon as the user carrying the proximity-detecting device enters the proximity area of a given lighting node, without having to interact with a light switch.

As shown in FIG. 2, the proximity-detecting device 200 is within the maximal signal range of identification signals Bi and $B_3$ and thus is capable of receiving and interpreting the identification signals and of determining a respective signal-strength value. In the case of identification signal Bi, the determined signal strength value is lower than the corresponding proximity threshold value. However, in the case of identification signal $B_3$, the determined signal-strength value is above the corresponding proximity threshold value and the proximity-detection unit generates and provides a proximity-information signal $P_3$ indicative of the proximity-detecting device being located within the proximity area 205 of the originating lighting node 203.

The proximity-information signal $P_3$ is received by the arrangement control unit 220, which is in turn configured to generate and provide, for instance, a light-on instruction to the lighting node 203 indicative of an instruction to turn on the lighting unit.

Therefore, the lighting unit of the lighting node 203 is turned on when the proximity-sensing device detects that the signal-strength value of the received identification signal is above the associated proximity threshold value.

Figure 3A:
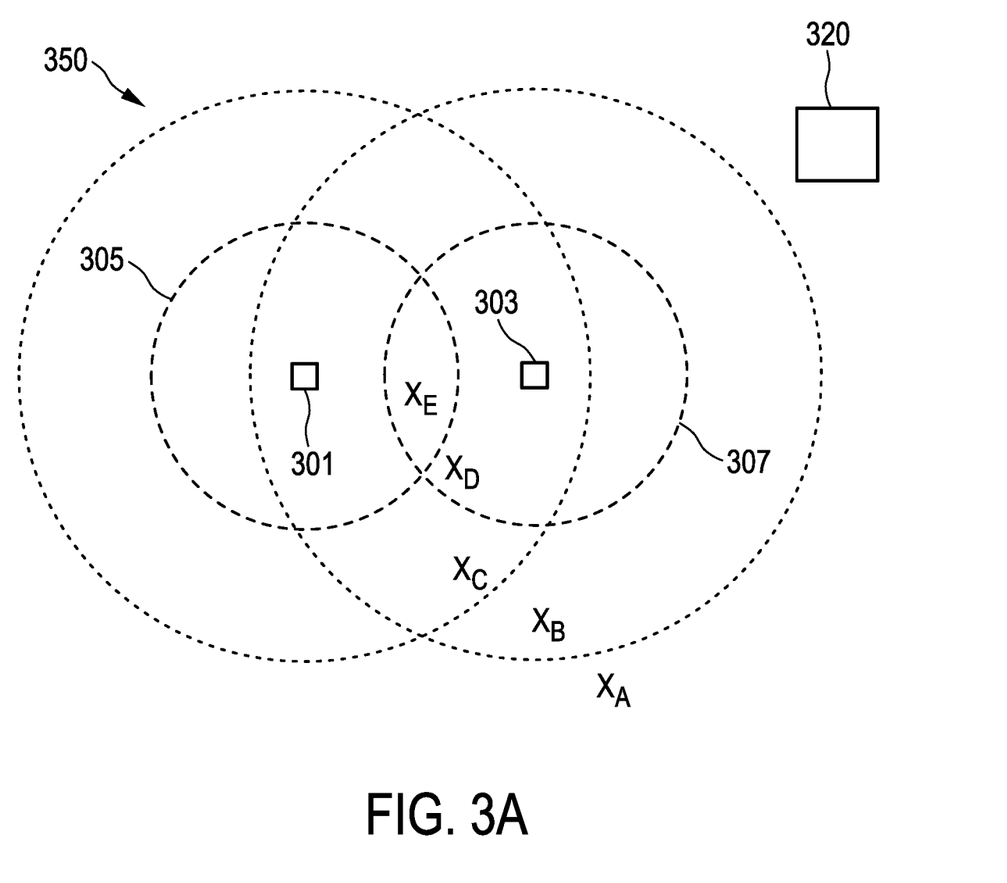
FIG. 3A shows a schematic diagram of an embodiment of a lighting arrangement comprising a proximity-detecting device located at different positions.
Figure 3B:
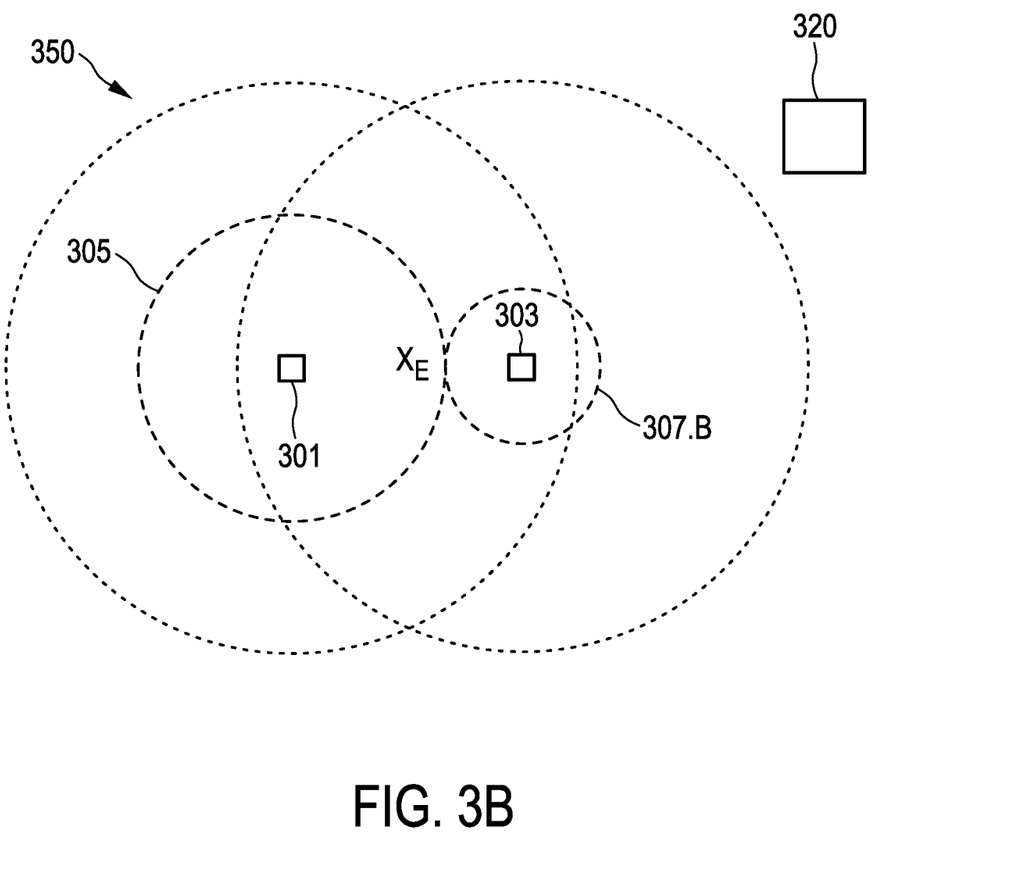
FIG. 3B shows the lighting arrangement of FIG. 3A after an update of the proximity threshold value.

FIGS. 3A and 3B shows further operation examples of a lighting arrangement 350. The discussion of the lighting arrangement of FIGS. 3A and 3B is based on the description of lighting arrangement 250 of FIG. 2. Those technical features shared by both lighting arrangements will be referred to using the same reference number except for the first digit, which is "2" for the lighting arrangement 250 of FIG. 2 and "3" for the lighting arrangement 350 of FIGS. 3A and 3B. In FIG. 3A, different positions $X_A$, $X_B$, $X_C$, $X_D$ and $X_E$ of the same proximity-detecting device are indicated. The following discussion will explain how the lighting arrangement 350 is configured to operate depending on the position of the proximity-detecting device.

When the proximity-detecting device is placed on position $X_A$, it does not receive any identification signal, since the position lies outside the maximal identification signal range of lighting nodes 301 and 303. In position $X_B$ the proximity-detecting device receives the identification signal from lighting node 303 and in position $X_C$ the proximity-detecting device receives the identification signal from both lighting nodes. However, in neither case is the determined signal-strength value of the identification signals higher than the associated proximity threshold value and no proximity-information signal is provided.

The case wherein the proximity-detecting device is located in position $X_D$ is the same as the one explained with reference to FIG. 2. The proximity-detecting device does in this case provide a proximity-information signal indicative of the proximity-detecting device being in the proximity area of lighting node 303.

In position $X_E$, the proximity-detecting device receives identification signals from lighting nodes 301 and 303 and the received signal-strength values of both identification signals exceed the corresponding proximity threshold value. Thus, two different proximity-information signals are generated and provided to the arrangement control unit 350, indicating that the proximity-detecting device is within the proximity areas of both originating lighting nodes 301, 303.

Receiving more than one proximity-information signal within a predetermined time span that depends on the frequency at which the identification signals are provided can be an indication that the proximity areas of a plurality of lighting nodes overlap. This can lead to undesired triggering of lighting node, at least from the user's point of view. An expert user could eventually manually adjust the proximity threshold values for each lighting node to improve the performance of the arrangement. However, this requires expertise and is a complex and time consuming task. Thus, the proximity-detecting device is advantageously configured to adjust the proximity-threshold values in dependence on predetermined updating-conditions associated with the node identification information of the received identification signals.

The proximity-detecting device comprises a threshold-determination unit that is configured to determine fulfilment of pre-stored threshold updating criterion, and, upon determining the fulfilment, to update the proximity threshold value for the given originating lighting node, thereby redefining the proximity area associated with the given originating lighting node.

This is shown in FIG. 3B, following the discussion of FIG. 3A where the proximity-detecting device was moved from position $X_D$ to position $X_E$. In this particular example, the threshold-determination unit is configured to determine a number of proximity areas of originating lighting nodes within which the proximity-detecting device is simultaneously located. When in position $X_D$, the number of proximity areas is one, namely area 307. However, when the current position moves to $X_E$, and an identification signal is provided, the number of proximity areas increases to two, namely 305 and 307.

In this example, the updating-conditions comprise a detection of an increase of said number. When moving from $X_D$ to $X_E$ this condition is fulfilled, and the threshold-determination unit is configured to increase the proximity threshold value of at least one of the originating lighting nodes that are within the respective proximity area by a predetermined amount. In the particular example shown in FIG. 3B only the proximity-threshold value associated to lighting node is increased, thus effectively reducing the proximity area 307.B when compared to proximity area 307 of FIG. 3A. In alternative cases, both proximity threshold values can be simultaneously increased to ensure that overlapping areas of the proximity areas are minimized.

Which proximity threshold value is to be changed is part of the pre-stored threshold-updating criterion and several different implementations are thus possible, depending on the user's intention.

For example, as explained above, in a case where both lighting nodes are identical, as inferred from the respective lighting-node identification information, the threshold-updating criterion can be defined so as to increase the proximity threshold value of both lamps by a predetermined relative value, e.g., a 1%, 2% or 5% relative increase. Preferably, this procedure is repeated until only one of the different proximity threshold values is exceeded, meaning that the proximity-detecting device is only within one of the redefined proximity areas.

Also, an alternative threshold-updating criterion includes changing the proximity threshold value of lighting nodes according to a predetermined hierarchical list of devices, assigning different priority values to different lighting nodes, and changing those values assigned to the lighting nodes having a higher or a lower priority.

The proximity-detecting device can be advantageously used both to set an initial proximity threshold value for a lighting node as well as to update an existing proximity-threshold value.

In another example, the lighting nodes are not equal, at least from a transmission perspective. For instance, one of the lighting nodes belongs to an older generation of devices, or has a less powerful transmitter, or is constructed with different materials such that the maximal signal range is comparatively smaller than the maximal signal range of the other lighting nodes. This information is inferred from the received lighting-node identification information. In this case, the threshold-updating criterion can be defined so as to modify the proximity threshold values differently for each lighting node. A preferred option is to define a proportionally smaller proximity area for the lighting node with smaller signal range. This is achieved by increasing the proximity threshold value of that lighting node with smaller signal range.

Further, the lighting-node identification information can be indicative of location-information indicative of an assigned installation location of the originating lighting node. For instance, a lighting node can be labeled as "door-light", "entrance-light", "window-light", etc. The updating-conditions may further comprise a detection of one of a set of predetermined installation locations, such as "door", "entrance", "window", "corridor", or any other terms related to a specific location at which a lighting node can be arranged. These could also be terms associated to the group/room in which the lighting node is placed (e.g. toilet, living, hallway) or terms associated to the type or application of the light node (e.g. wall light, kitchen pendant, bathroom ceiling light). This installation location information can for example be provided by a user through configuration in a smartphone app or retrieved from a building information model (BIM). In this particular case, the threshold-determination unit is advantageously configured to determine, using the ascertained installation location, i.e. determining whether or not the node identification information includes a reference to one of a set of predetermined installation locations, which of the signal strength threshold values is to be changed.

For example, a lighting node labeled as "entrance" or "door" is in principle more exposed to false positives caused by the user carrying the proximity-detecting device walking outside of the room where the lighting node is installed, or a lighting node labeled as "porch" or "façade" can be more exposed to false positives caused by the user carrying the proximity-detecting device walking inside the room adjacent to the porch or the façade. Also, a lighting node labeled as "window" can be expected to have less influence from other rooms and therefore a comparatively higher initial proximity threshold value can be set.

In another arrangement, the signal input unit of the proximity-detecting device is further configured to receive operation-data indicative of an operation-instruction directed to one or more of the lighting nodes for controlling operation of the lighting nodes. As explained above, the updating-conditions comprise the detection of one of a set of predetermined operation-instructions, and the threshold-determination unit is further connected to the operation-data input and additionally configured to update the proximity threshold value further using the received operation-data.

This particular proximity-detecting device is advantageously configured to update the proximity threshold values further based on override-instructions. Override-instructions are defined as operation-instructions, generated within a predetermined time span from the provision of the operation-instruction automatically generated based on the proximity-information signal, and which override said operation-instruction. The override instructions can be generated either by a user or by an external device such as a sensing device. For instance, a user carrying a proximity-detecting device walks close to an originating lighting node. At a given distance therefrom, the signal strength value of the received identification signal exceeds the proximity threshold value and a proximity-information signal is generated and provided to either a node-control unit being part of the proximity-detecting device or to an external arrangement-control unit. In either case, operation-data indicative of a predetermined operation-instruction for controlling operation of the originating lighting node is automatically, i.e. without further user interaction, generated and provided to the lighting node, for example requesting the lighting node to turn on its lighting unit. The lighting node received the operation-data and the lighting unit is turned on. However, within a predetermined time span, the user generates and provides an alternative operation-instruction, requesting the lighting node to turn off its lighting unit.

This alternative operation-instruction is received by the proximity-detecting device. Based on a suitable threshold-updating criterion, the threshold determination unit can, in this case, increase the proximity threshold value of that lighting node, since the described user behavior is an indication that the lighting node has reacted in a way not as desired by the user. Correspondingly, when an identification signal is received with a given signal strength value below the corresponding proximity threshold value, but the user generates operation-data indicative of an operation-instruction for turning on the lighting unit of the lighting device, the threshold-determination unit can be also configured to set the proximity threshold value to the signal strength value of the received identification signal.

The overriding operation-instructions need not come from that proximity-detecting device that is within the proximity area. Also, another user or device can provide the overriding operation-instructions. For instance, a user carrying a proximity-detecting device walks into a room A adjacent to that room B where the lighting node is, and triggers proximity-based operation of the lighting node in B, which is turned on as a result. Another user, located in B, finds this disturbing and provides an operation-instruction for turning off the lighting node and thus overriding the automatically generated operation-instruction. The threshold-determination unit is then advantageously configured to update the proximity threshold value for the given originating lighting node based on the received operation-data provided by the user in B. In particular, the proximity threshold value is increased by a predetermined amount.

In an exemplary arrangement (not shown) one or more of the originating lighting nodes is a portable lighting device such as, but not limited to, a Hue Go lamp. A suitable threshold-updating criterion comprises an updating condition which discards the signal-strength value of the identification signal provided by the portable light sources if the proximity detection device is located within the proximity area of another lighting node, or in other words the portable light is activated based on proximity only if no other lighting nodes are close. Further, a purpose of the portable light source can be inferred based on how it is used. If the proximity-detecting device ascertains that the portable light is currently being used as a stationary light source, it is treated exactly as any other lighting node. In case the proximity-detecting device ascertains that the portable light is often repositioned, it can treat it as portable light and apply the criterion described above. Alternatively, the proximity-detecting device can by default make the proximity threshold for portable light sources substantially higher than for stationary lighting nodes, so that the proximity areas associated to them are substantially smaller and a portable light is only activated when the proximity-detecting device is very close to it. The portable light is then treated as any other lighting node.

Figure 4:
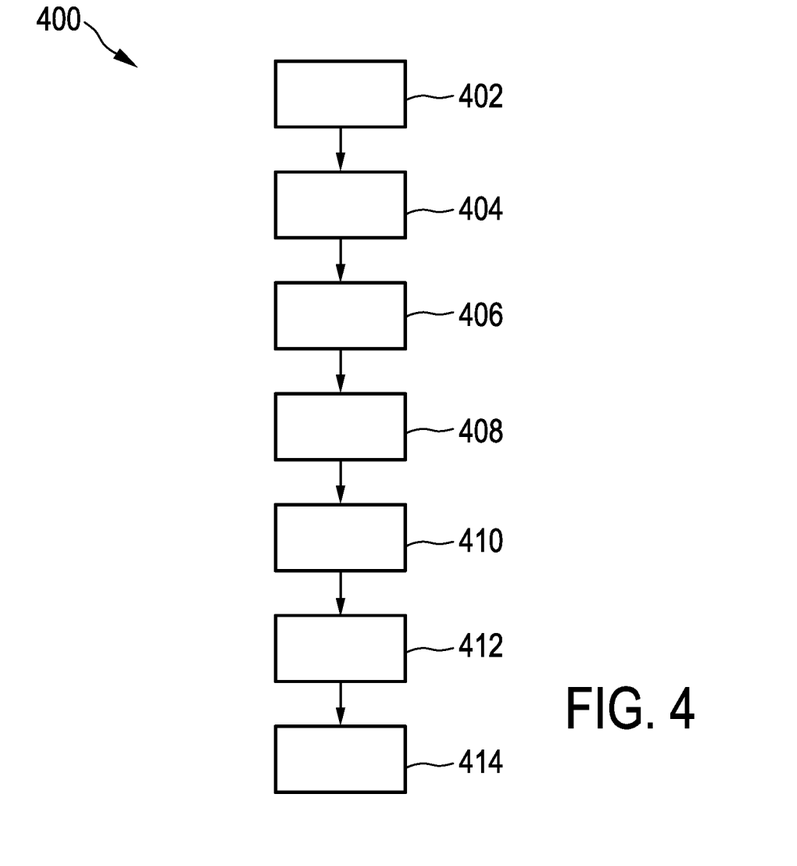
FIG. 4 shows a flow diagram of an embodiment of a method for a proximity-detecting device.

FIG. 4 shows a flow diagram of a particular embodiment of a method 400 for operating a proximity-detecting device. The method comprises, in a step 402, receiving from originating lighting nodes, wireless identification signals comprising respective lighting-node identification information. The method comprises, in a step 404, determining a signal-strength value indicative of a received signal power amount of the identification signal of the respective originating lighting node. Upon determining that the received-signal-strength value exceeds a predetermined proximity threshold value associated with the originating lighting node, the method further comprises, in a step 406, generating and providing a proximity-information signal indicative of the originating lighting node being located within a predetermined proximity area of the proximity-detection device. Also, upon determining fulfilment of a pre-stored threshold-updating criterion for updating a given proximity threshold value for a given originating lighting node, wherein the threshold-updating criterion comprises one or more updating-conditions associated with the node identification information of the received identification signals, the method further comprises, in a step 408, updating the proximity threshold value for the given originating lighting node, for redefining the proximity area associated with the given originating lighting node.

Particularly, this embodiment of the method 400 also comprises, in a step 410, receiving the proximity-information signal, in a step 412, generating operation-data indicative of a predetermined operation-instruction for controlling operation of the originating lighting node within the proximity area, and in a step 414, providing the operation-data to the originating lighting node within the proximity area.

Figure 5:
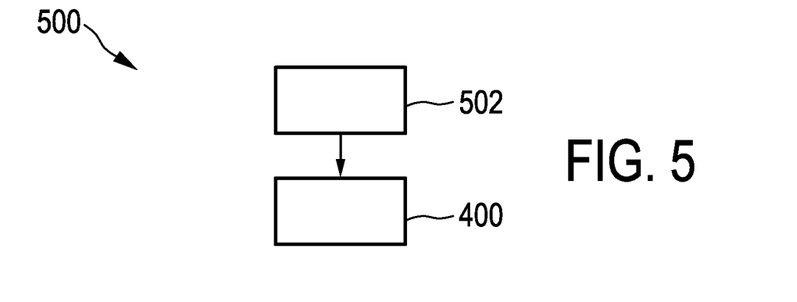
FIG. 5 shows a flow diagram of an embodiment of a method for controlling operation of a lighting arrangement.

FIG. 5 shows a flow diagram of a method 500 for controlling operation of a lighting arrangement. The method comprises, in a step 502, providing wireless identification signals comprising lighting-node identification information. Further, the method comprises carrying out the method steps of method 400 described above.

In summary, the invention is directed to a proximity-detecting device configured to determine a signal-strength value indicative of a received signal power amount of an identification signal of an originating lighting node that comprises lighting-node identification information and that is received via a signal input unit. It also comprises a proximity-detection unit configured, upon determining that the received signal-strength value exceeds a predetermined proximity threshold value, to generate and provide a proximity-information signal indicative of the proximity-detecting device being within a proximity area. It also comprises a threshold-determination unit configured, upon determining fulfilment of a pre-stored threshold-updating criterion comprising one or more updating-conditions associated with the lighting-node identification information, to update the proximity threshold value for the given originating lighting node, for redefining the proximity area associated with the given originating lighting node, thus reducing the complexity of threshold adaptation.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A proximity-detecting device, comprising,
a signal input unit for receiving, from external originating lighting nodes, wireless identification signals comprising respective lighting-node identification information;
a signal-strength determination unit connected to the signal input unit and configured to determine a signal-strength value indicative of a received signal power amount of the identification signal of the respective originating lighting node;

a proximity-detection unit connected to the signal-strength determination unit and configured, upon determining that the received signal-strength value exceeds a predetermined proximity threshold value associated with the originating lighting node, to generate and provide a proximity-information signal indicative of the proximity-detecting device being located within a predetermined proximity area of the originating lighting node; and a threshold-determination unit connected to the signal input unit, to the signal-strength determination unit and to the proximity-detection unit and configured, upon determining fulfilment of a pre-stored threshold-updating criterion, for updating a given proximity threshold value for a given originating lighting node, wherein the threshold-updating criterion comprises one or more updating-conditions associated with the lighting-node identification information of the received identification signals, to update the proximity threshold value for the given originating lighting node, for redefining the proximity area associated with the given originating lighting node.

2. The proximity-detecting device of claim 1, further comprising a node-control unit configured:
to receive the proximity-information signal from the proximity-detection unit;
to generate operation-data indicative of a predetermined operation-instruction for controlling operation of the originating lighting node within the proximity area; and
to provide the operation-data-K: to the originating lighting node within the proximity area.

3. The proximity-detecting device of claim 1, wherein the threshold-determination unit is configured to determine a number of proximity areas of originating lighting nodes within which the proximity-detecting device is simultaneously located; wherein:
the updating-conditions comprise a detection of an increase of said number; and
wherein the threshold-determination unit is configured, upon fulfillment of the threshold-updating criterion, to increase the proximity threshold value of at least one of the originating lighting nodes that are within the respective proximity area by a predetermined amount.

4. The proximity-detecting device of claim 3, wherein the threshold-determination unit is further configured:
to ascertain, using the lighting-node identification information received, power-information indicative of a transmission-power amount of the respective identification signal; and
to determine, using the power-information, which of the signal strength threshold values is to be changed.

5. The proximity-detecting device of claim 3, wherein the threshold-determination unit is further configured to ascertain, from the lighting-node identification information received, location-information indicative of an assigned installation location of the originating lighting node;
wherein the updating-conditions comprise a detection of one of a set of predetermined installation locations; and
wherein the threshold-determination unit is configured to determine, using the ascertained installation location, which of the signal strength threshold values is to be changed.

6. The proximity-detecting device of claim 1, wherein the signal input unit is further configured to receive operation-data indicative of an operation-instruction directed to one or more of the lighting nodes for controlling operation of the lighting nodes;
wherein the updating-conditions comprise a detection of one of a set of predetermined operation-instructions; and
wherein the threshold-determination unit is further connected to the operation-data input and additionally configured to update the proximity threshold value further using the received operation-data.

7. A lighting arrangement comprising:
a proximity-detecting device according to claim 1;
at least one lighting node including:
a lighting unit configured to emit light;
an identification-signal output unit for providing a wireless identification signal comprising lighting node identification information;
an input unit for receiving operation-data comprising an operation-instruction;
a lighting control unit configured to receive the operation-instruction and to control operation of the lighting unit using the operation-instruction; and
an arrangement control unit configured to receive, from the proximity-detecting device, the proximity-information signal and to generate and provide operation-data comprising a predetermined operation-instruction for controlling operation of the originating lighting node within the proximity area.

8. The lighting arrangement of claim 7, wherein the proximity-detecting device comprises the arrangement control unit.

9. The lighting arrangement of claim 7, wherein the provision of the wireless identification signals and of the operation-data is performed in accordance with an IEEE 802.15.4 wireless communication protocol.

10. A method for operating a proximity-detecting device, the method comprising:
receiving from originating lighting nodes, wireless identification signals comprising respective lighting-node identification information;
determining a signal-strength value indicative of a received signal power amount of the identification signal of the respective originating lighting node;
upon determining that the received-signal-strength value exceeds a predetermined proximity threshold value associated with the originating lighting node, generating and providing a proximity-information signal indicative of the originating lighting node being located within a predetermined proximity area of the proximity-detection device; and
upon determining fulfilment of a pre-stored threshold-updating criterion for updating a given proximity threshold value for a given originating lighting node, wherein the threshold-updating criterion comprises one or more updating-conditions associated with the node identification information of the received identification signals, updating the proximity threshold value for the given originating lighting node, for redefining the proximity area associated with the given originating lighting node.

11. The method of claim 10, further comprising:
receiving the proximity-information signal;
generating operation-data indicative of a predetermined operation-instruction for controlling operation of the originating lighting node within the proximity area; and
providing the operation-data to the originating lighting node within the proximity area.

12. A method for controlling operation of a lighting arrangement, the method comprising:
   providing wireless identification signals comprising lighting-node identification information; and
   carrying out the method of claim 11.

13. A non-tranitory computer readable medium comprising instructions which, when the program is executed by a computer, cause the computer to carry out the method of claim 10.

* * * * *